United States Patent
Ansari et al.

(10) Patent No.: US 8,553,113 B2
(45) Date of Patent: Oct. 8, 2013

(54) DIGITAL IMAGE CAPTURING SYSTEM AND METHOD

(75) Inventors: Ahmad C. Ansari, Austin, TX (US); Donald Kevin Reynolds, Jr., Austin, TX (US); David Bruce Hartman, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1643 days.

(21) Appl. No.: 10/644,261

(22) Filed: Aug. 20, 2003

(65) Prior Publication Data

US 2005/0041123 A1 Feb. 24, 2005

(51) Int. Cl.
*H04N 5/247* (2006.01)
*H04N 5/225* (2006.01)
*H04N 7/18* (2006.01)

(52) U.S. Cl.
USPC ............... 348/264; 348/218.1; 348/219.1; 348/148; 348/158; 348/159

(58) Field of Classification Search
USPC .......... 348/207.1, 207.11, 211.8, 218.1, 262, 348/264, 211.3, 340, 291, 335, 348/211.11–211.13; 257/202–211; 359/196–324, 196.1–226.3
See application file for complete search history.

(56) References Cited

U.S. PATENT DOCUMENTS

| | | | | |
|---|---|---|---|---|
| 5,898,459 A * | 4/1999 | Smith et al. | .............. | 348/219.1 |
| 5,920,337 A * | 7/1999 | Glassman et al. | .............. | 348/36 |
| 6,046,772 A | 4/2000 | Howell | .............. | 348/273 |
| 6,097,023 A * | 8/2000 | Schofield et al. | .............. | 250/208.1 |
| 6,373,523 B1 | 4/2002 | Jang | .............. | 348/273 |
| 6,456,326 B2 | 9/2002 | Fossum et al. | .............. | 548/308 |
| 6,617,564 B2 * | 9/2003 | Ockerse et al. | .............. | 250/208.1 |
| 6,618,078 B1 * | 9/2003 | Budrys | .............. | 348/207.99 |
| 6,680,748 B1 * | 1/2004 | Monti | .............. | 348/220.1 |
| 6,757,009 B1 * | 6/2004 | Simon et al. | .............. | 348/148 |
| 6,791,076 B2 * | 9/2004 | Webster | .............. | 250/239 |
| 6,806,514 B1 * | 10/2004 | Tian et al. | .............. | 257/202 |
| 6,809,768 B1 | 10/2004 | Merrill | .............. | 348/308 |
| 6,842,290 B2 * | 1/2005 | Liang et al. | .............. | 359/619 |
| 6,900,478 B2 * | 5/2005 | Miyagi | .............. | 257/202 |
| 6,912,090 B2 * | 6/2005 | Kornblit et al. | .............. | 359/619 |
| 6,987,258 B2 * | 1/2006 | Mates | .............. | 250/208.1 |
| 7,002,621 B2 * | 2/2006 | Adair et al. | .............. | 348/158 |

(Continued)

OTHER PUBLICATIONS

Pellkofer et al., EMS-Vision: Gaze Control in Autonomous Vehicles, Oct. 2000, IEEE, Intelligent Vehicles Symposium 2000, pp. 296-301.*

*Primary Examiner* — Roberto Velez
*Assistant Examiner* — Pritham Prabhakher
(74) *Attorney, Agent, or Firm* — Toler Law Group, PC (57) ABSTRACT

A digital image capturing system and method are disclosed. A system incorporating teachings of the present disclosure may include a processing engine that performs digital image processing functions like noise reduction, gain control, white balance and others. In one embodiment, the image capturing system may have a first image sensor operable to capture a first view of a scene and a second image sensor operable to capture a second and different view of the scene. A selector may be employed to selectively route either the first view information or the second view information onto the processing engine. In preferred embodiments, the sensors may be CMOS sensors and, as such, relatively inexpensive. By allowing two inexpensive sensors to share image processing electronics, an image capturing system incorporating teachings of the present disclosure may be able to offer compelling functional characteristics at a reasonable price.

28 Claims, 3 Drawing Sheets

(56) References Cited

U.S. PATENT DOCUMENTS

| | | | |
|---|---|---|---|
| 7,009,652 B1* | 3/2006 | Tanida et al. | 348/340 |
| 7,012,637 B1* | 3/2006 | Blume et al. | 348/218.1 |
| 7,015,954 B1* | 3/2006 | Foote et al. | 348/218.1 |
| 7,023,913 B1* | 4/2006 | Monroe | 375/240.01 |
| 7,027,085 B2* | 4/2006 | Watanabe | 348/218.1 |
| 7,092,014 B1* | 8/2006 | Li et al. | 348/218.1 |
| 7,113,203 B1* | 9/2006 | Wu et al. | 348/207.99 |
| 7,196,301 B2* | 3/2007 | Thomas et al. | 250/206.1 |
| 7,425,984 B2* | 9/2008 | Chen et al. | 348/159 |
| 2001/0022627 A1* | 9/2001 | Bernhardt | 348/373 |
| 2002/0105699 A1* | 8/2002 | Miracky et al. | 359/159 |
| 2002/0181033 A1 | 12/2002 | Tandon et al. | 358/514 |
| 2003/0117488 A1* | 6/2003 | Pierce et al. | 348/48 |
| 2003/0117501 A1* | 6/2003 | Shirakawa | 348/218.1 |
| 2003/0122949 A1* | 7/2003 | Kanematsu et al. | 348/333.01 |
| 2003/0141434 A1* | 7/2003 | Ishikawa et al. | 250/208.1 |
| 2004/0012688 A1* | 1/2004 | Tinnerino et al. | 348/218.1 |
| 2004/0012689 A1* | 1/2004 | Tinnerino et al. | 348/218.1 |
| 2004/0027488 A1* | 2/2004 | Messina et al. | 348/584 |
| 2004/0085445 A1* | 5/2004 | Park | 348/143 |
| 2004/0196379 A1* | 10/2004 | Chen et al. | 348/218.1 |

\* cited by examiner

DIGITAL IMAGE CAPTURING SYSTEM AND METHOD

FIELD OF THE DISCLOSURE

The present disclosure relates to digital imaging technology, and more particularly to a digital image capturing system and method.

BACKGROUND OF THE DISCLOSURE

Digital image capturing devices, like digital still cameras and digital video cameras, store image information digitally rather than or in addition to recording the information on film. Digital image capture typically involves the conversion of incident light or photons into electronic charge with a photo-conversion process. Whether marketed to a consumer or a professional user, digital cameras have traditionally relied on Charge-Coupled Device (CCD) sensors to "see" the subject image or scene.

In recent years, Complimentary Metal Oxide Silicon (CMOS) integrated circuits (ICs) sensors have replaced CCD-sensors in entry-level devices. CMOS image sensors usually cost less than CCD image sensors and have facilitated the manufacturing of lower cost and lower power digital cameras. This advancement, along with the increased availability of broadband access to communication networks like the Internet, has helped to create a large market for new multimedia applications and services.

As mentioned above, the migration from analog to digital camera technologies was accelerated by the development of CMOS-based image sensors. A typical CCD image sensor requires specialized processing that is largely incompatible with other logic circuits and the semiconductor manufacturing processes. Additionally, CCD devices tend to have higher voltage and power requirements than CMOS image sensors. This combination of characteristics drives up the manufacturing cost of high resolution CCD sensor as compared with CMOS sensors of similar quality.

BRIEF DESCRIPTION OF THE DRAWINGS

The present invention is pointed out with particularity in the appended claims. However, features are described in the following detailed description in conjunction with the accompanying drawings in which:

DETAILED DESCRIPTION OF THE DRAWINGS

With the rapid evolution of digital imaging technology and data communication, the need or at least the desire to capture images and to electronically send and receive those images is increasing. To satisfy this need, image pickup devices, such as CCD and CMOS image sensors, have been utilized to help create the digital photography industry.

Figure 1:
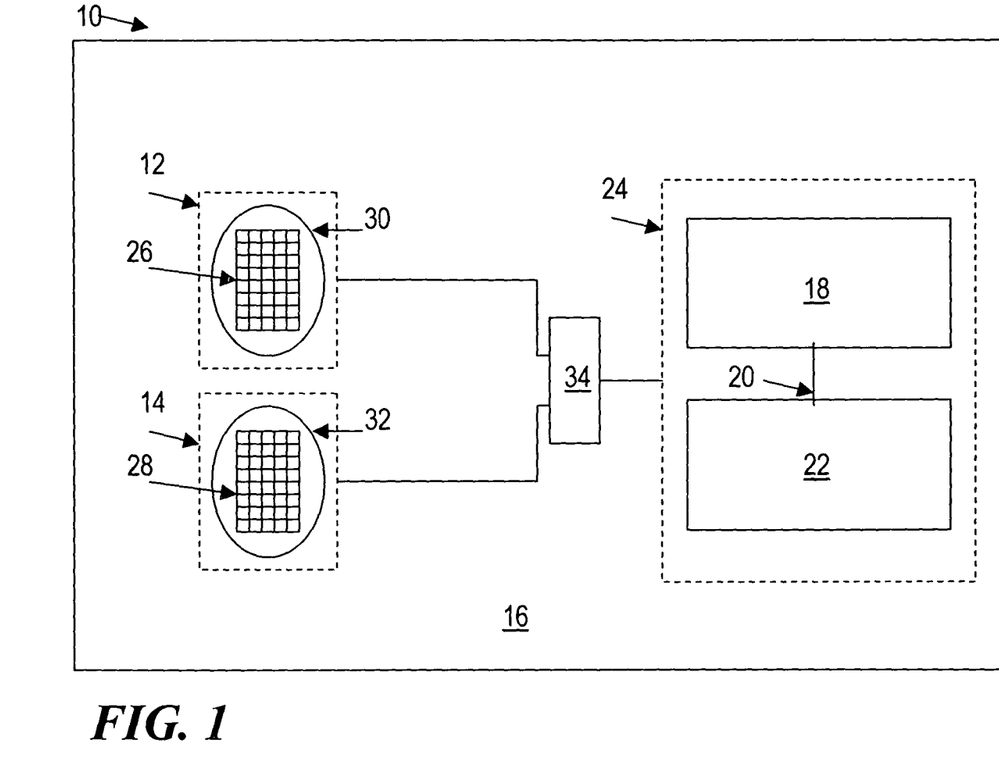
FIG. 1 shows a block diagram of a digital image sensing system incorporating teachings of the present disclosure.

As mentioned above, FIG. 1 shows a block diagram of a digital image sensing system 10, which incorporates teachings of the present disclosure. In the embodiment of FIG. 1, system 10 includes two image sensor lens (ISL) modules 12 and 14. An ISL may be formed from the integration of a lens and a sensor. When a sensor, be it CMOS or CCD, is packaged with a lens, the resulting module may form an image sensor lens (ISL) module. Such an ISL may facilitate lower cost manufacturing of cameras for videoconferencing equipment, traffic monitoring solutions, space and security surveillance devices, personal computers, or PDAs. An example ISL may be Sharp Corporations LZOP3800.

Modules 12 and 14 may include CCD, CMOS, or other appropriate sensors. In lower cost embodiments, modules 12 and 14 may be CMOS devices, as CMOS sensors are often easier to build. Manufacturing a CCD sensor typically involves the VLSI process, or very large-scale integration process—a technique used to place hundreds of thousands of electronic components on a single chip. In the CCD manufacturing process, a closely packed mesh of polysilicon electrodes is formed on the surface of a chip. During the operation of a CCD sensor, individual packets of electrons may be kept intact while they are physically moved from the position where light was detected, across the surface of the chip, to an output amplifier.

CCD sensors often capture a high quality image, but translating the captured image into the "picture" taken by a CCD-based device often requires several additional chips. A chip or integrated circuit typically refers to a unit of packaged electronic circuitry manufactured from a material like silicon at a small scale or very small scale.

A typical chip may contain, among other things, program logic and memory. Chips may be made to include combinations of logic and memory and used for special purposes such as analog-to-digital (A/D) conversion, bit slicing, etc. In some embodiments of a CCD-device, camera functions, like clock drivers, timing logic, as well as signal processing may be implemented in secondary chips. As a result, most CCD cameras tend to have several chips or integrated circuits.

CMOS imagers sense light in the same way as CCD imagers, but once the light has been detected, CMOS devices operate differently. The charge packets are not usually transferred across the device. They are instead detected at an early stage by charge sensing amplifiers, which may be made from CMOS transistors.

In some CMOS sensors, amplifiers are implemented at the top of each column of pixels—the pixels themselves contain just one transistor, which may also be used as a charge gate, switching the contents of the pixel to the charge amplifiers. This type of sensor may be referred to as a passive pixel CMOS sensor. In active pixel CMOS sensors, amplifiers are implemented in each pixel. Active pixel CMOS sensors often contain at least 3 transistors per pixel. Generally, the active pixel form of CMOS sensor has lower noise but poorer packing density than passive pixel CMOS sensors.

CMOS cameras may also enjoy a relatively high level of integration—in that much of the camera functions may be included on the same chip as the CMOS sensor. In the embodiment depicted in FIG. 1, modules 12 and 14 share a chip, chip 16, with several other pieces of logic and memory. For example, processing engine 18, which may perform various image processing functions like artifact removal or correction, exposure control, white balance, zoom, etc., is located on chip 16. Processing engine 18 may be communicatively coupled via link 20 with memory 22.

The combination of process engine 18 and memory 22 may form a processing electronics module 24, which supports both module 12 and module 14. Processing electronics module 24 may also perform other camera related functions like bus management, analog to digital conversion (A/D conversion) or timing and clocking functions. As shown in FIG. 1, various image processing and camera management functions may be implemented on-chip with multiple modules to effectively make a complete one-chip camera.

If the sensors 26 and 28, which help to make up modules 12 and 14, respectively, are CMOS image sensors, a camera incorporating chip 16 may be manufactured at a relatively low cost and may consume about $1/3^{rd}$ to $1/5^{th}$ as much power as an equivalent CCD-based camera. As depicted, sensors 26 and 28 include several pixels and help to form modules 12 and 14. Other components of modules 12 and 14 include lens 30 and 32, which may be the same or different.

As mentioned above, key peripheral circuitry, which may include logic, memory, or both, may be integrated onto chip 16 within processing electronics module 24 or elsewhere or as part of a related chipset. The peripheral circuitry may include a digital signal processing (DSP) core, a timing IC (which may generate timing pulses to drive a sensor), CDS (Correlated Double Sampling noise reduction), AGC (Automatic Gain Control to stabilize output levels), 8-bit A/D converter, etc. Though potentially easier with CMOS-based sensors, the peripheral circuitry may be integrated with either CCD or CMOS sensors. It may be more cost effective when integrating with a CMOS sensor, because the peripheral circuitry may be more easily included on the same chip as the sensor.

In addition to simpler peripheral component integration, CMOS sensor technology may also allow individual pixels to be randomly accessed at high speed. As a result, applications like electronic zooming and panning may be performed at relatively high speeds with an embodiment like system 10. As shown, system 10 has a single instance of image and camera control circuitry, embodied in processing electronics module 24, supporting both ISL modules 12 and 14.

In operation of system 10, a selection mechanism, like selector 34, may act as a gatekeeper or router. Selector 34 may be responsive to processing electronics module 24 and may selectively route raw or minimally processed image information captured by modules 12 and 14 to processing engine 18. In some embodiments, processing engine 18 may be capable of simultaneously processing image information from both module 12 and module 14. In other embodiments, processing engine 18 may be designed to process image data from one module at a time.

Selector 34 may be defined for a given application to offer seamless or near-seamless views of different scenes and objects. Selector 34 may include a triggering engine as well as a switching engine. In an embodiment where module 12 and module 14 are capturing different views of a common scene, a triggering engine may be capable of determining which module is capturing the desired view. With multi-view capabilities, system 10 may be incorporated into several different camera designs and/or applications. For example, still cameras, videoconferencing cameras, traffic monitoring cameras, or space and security cameras, could all make use of the teachings of this disclosure.

As mentioned above, FIG. 2 depicts a communication system 36 with an imaging device 38 that incorporates teachings of the present disclosure. Imaging device 38 may have a single instance of processing electronics 40 supporting several image sensor lens modules 42, 44, 46, 48, and 50. In a device 38 embodiment in which processing electronics 40 processes image information from one module at a time, a selection mechanism 52 or other selector may be used to choose which image information is forwarded along or routed to processing electronics 40.

Figure 2:
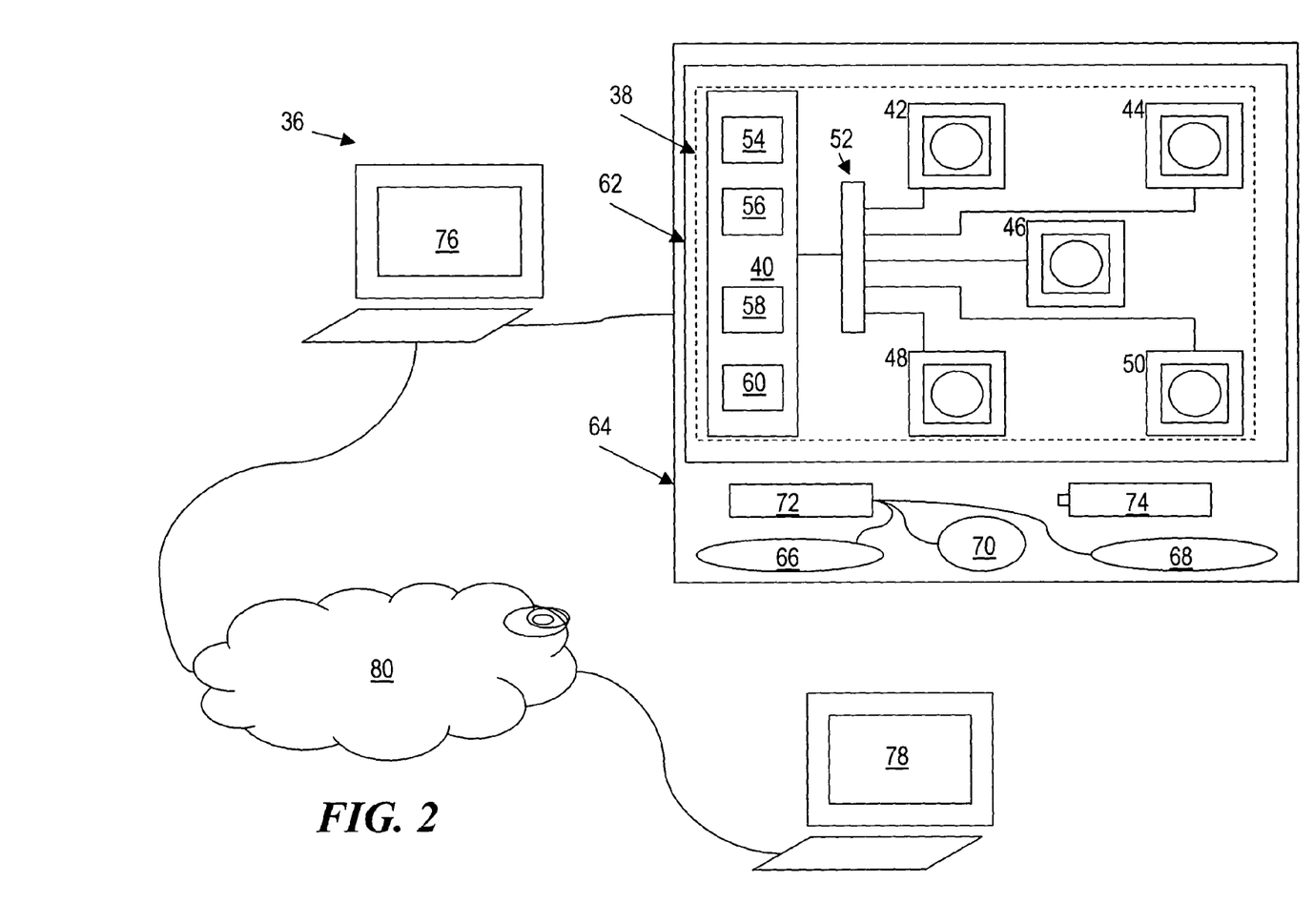
FIG. 2 depicts a communication system with an imaging device that incorporates teachings of the present disclosure. The imaging device of FIG. 2 has a single instance of image processing capability supporting several image sensor lens modules.

In one embodiment of device 38, modules 42, 44, 46, 48, and 50 may be CMOS-based ISL modules and processing electronics 40 may include advanced image and video processing technologies. In such an embodiment, device 38 may offer a cost effective, reliable, and flexible solution to digital camera designs for a variety of different applications. As depicted, several modules share a single instance of processing electronics 40. Processing electronics 40 may include a common or shared camera image processing engine 54, camera control engine 56, triggering engine 58, and memory 60, which may support one or more of the engines resident in processing electronics 40.

In the embodiment depicted in FIG. 2, image processing engine 54 may take raw image information captured by an ISL module or other sensor assembly and convert into a viewable image. Image processing engine 54 may be capable in some embodiments to effectively replace some functionalities provided mechanically in other systems. For example, module 42 may actually include a Mechanical Pan Tilt and Zoom (MPTZ) assembly, and module 44 may rely on processing engine 54 to effectively replicate the MPTZ functionality by processing the information captured by module 44 in a manner consistent with replicating the otherwise mechanical features. By relying on processing engine 54, module 44 may perform much like an MPTZ assembly without incurring some of the more typical challenges associated with the use of mechanical devices in cameras, such as frequent failures of the mechanical components, sluggish response to real-time video applications, and costly implementations.

Camera control engine 56 may direct operational details like timing functions for various ISL modules. Triggering engine 58 may identify the one module from the group of modules that is capturing a specific view of a scene and signal selector 52 to route the specific view information captured by the one module to processing engine 54.

In preferred embodiments, modules 42, 44, 46, 48, and 50 may have different resolutions, different optical characteristics, and/or different fields of view. One optical characteristic that may be modified between multiple modules is focal length. Generally speaking, focal length is the distance between the lens and the surface of the sensor. The surface of a film sensor tends to be larger than the surface of a CCD or CMOS sensor. A typical 1.3-megapixel digital sensor is approximately one-sixth the linear dimensions of film. To project an image onto a smaller sensor, it is often necessary to shorten the focal length by the same proportion.

Focal length is also a critical characteristic in determining how much magnification a user sees when looking through the lens of a camera. As focal length increases, magnification increases, and objects appear to get closer. As the focal length decreases, things appear to get farther away, but the sensor may capture a wider field of view in the camera. As such, device 38 may have two modules with different focal lengths and the same orientation. The same or similar point in space may represent the center of the modules' respective fields of view, but the first module may be narrowly focused on a point ten feet in front of device 38 and the second device may focus more broadly on a point twenty feet in front of device 38.

The above example presupposes that the lenses of the two modules are fixed zoom lenses. Digital camera lenses may take several forms including fixed-focus/fixed-zoom, fish eye, panoramic, color, black and white, optical zoom, digital zoom, replaceable, or combinations thereof. A fixed-focus, fixed-zoom lens may be found on a disposable or inexpensive camera module. An optical-zoom lens with an automatic focus may be found on a video camcorder. The optical-zoom lens may have both a "wide" and "telephoto" option while maintaining image focus.

A digital-zoom lens usually takes pixels from the center of the image sensor and "interpolates" them to make a full-size image. Depending on the resolution of the image and the sensor, this approach may create a grainy or fuzzy image when zoomed. Device 38 may effectively do the same thing a digital zoom lens is doing by selecting the center of the image using image processing software or logic and magnifying the selected portion. Such a feature may be implemented, for example, in image processing engine 54. Some high-end digital cameras may also come with a replaceable lens system allowing the user to match the lens to the imaging need.

As indicated above, a zoom lens is usually a lens that has an adjustable focal length. Digital cameras incorporating teachings of the present disclosure may have an optical zoom, a digital zoom, or both. An optical zoom actually changes the focal length of the lens. As a result, the lens magnifies the image. With greater magnification, the light is spread across the entire CCD or CMOS sensor and all of the pixels may be used. Optical zoom tends to be a true zoom that improves the quality of the captured images.

A digital zoom involves bit manipulation and interpolation to magnify a portion of the information that hits the sensor. If a user is capturing a picture with a 2× digital zoom, the camera will use half of the pixels at the center of the sensor and ignore all the other pixels. The device will use interpolation techniques to add detail to the photo. Although it may look like the user is capturing a picture with twice the magnification, the user or the device can get the same results by capturing the photo without a zoom lens and "blowing up" the picture using software or logic.

Referring back to FIG. 2, device 38 may be a single chip device and embodied in a single integrated circuit or formed on a common substrate 62. Substrate 62 may be mounted on a support 64 that has an exterior surface or mounting surface. As depicted, support 64 has a generally planar geometry. Supports could take several other geometries, including generally cylindrical geometries and generally spherical geometries. In some embodiments, devices like device 38 and/or individual ISL modules may be adjustably secured to a mounting surface. For example, if device 38 is part of a video conferencing appliance, an end user may want the ability to reposition the video sensors to ensure that each attendee of the videoconference is captured in at least one scene view or included in the field of view of at least one ISL module. Users may want this capability in other applications as well. For example, a city may want to make sure that in a traffic camera application, all appropriate scene views are captured. In a surveillance application, a user may have similar desires.

Whatever the application, an image capturing system incorporating teachings of the present disclosure may also include other types of sensors. The system could, for example, include motion detectors. A system may also include a microphone assembly like directional microphones 66 and 68. In addition to their normal functions, a directional microphone or a motion detector may act as a directional determination assembly that detects a direction of activity in a given scene and outputs a signal that indicates the activity direction. The signal may, in some embodiments, be communicated to triggering engine 58 or to some other directional determination engine.

As mentioned above, device 38 may be incorporated into a video conferencing appliance. In such an embodiment, a speaker assembly 70 may be employed. Speaker assembly 70 and directional microphones 66 and 68 may be communicatively coupled to an audio engine 72 capable of managing A/D conversions and other audio specific functions. Audio engine 72 may be stand alone (as shown in FIG. 2) or included in processing electronics 40. In use, the various electronic components depicted in FIG. 2 may be powered by on-board power like battery 74, some external source of power, or both.

In some systems incorporating teachings of the present disclosure, an external computing system may be employed. As depicted in FIG. 2, external computing system 76 is communicatively coupled via an interface to an output of processing electronics 40. Information captured by 42, 44, 46, 48, and/or 50 may be communicated to processing electronics 40 for manipulation and onto computing system 76, where the now-processed information may be processed again or communicated along to a remote computing systems 78, another videoconferencing device, or a plurality of remote systems and devices.

The information communicated between computing system 76 and remote computing system 78 may be compressed and/or encrypted prior to communication via a circuit-switched network like most wireline telephony networks, a frame-based network like Fibre Channel, or a packet-switched network that may communicate using TCP/IP packets like Internet 80. The physical medium caring the information could be coaxial cable, fiber, twisted pair, an air interface, other, or combination thereof. In some embodiments, a broadband connection may be preferred and an xDSL modem, a cable modem, an 802.11x device, another broadband wireless linking device, or combination thereof may be employed.

Figure 3:
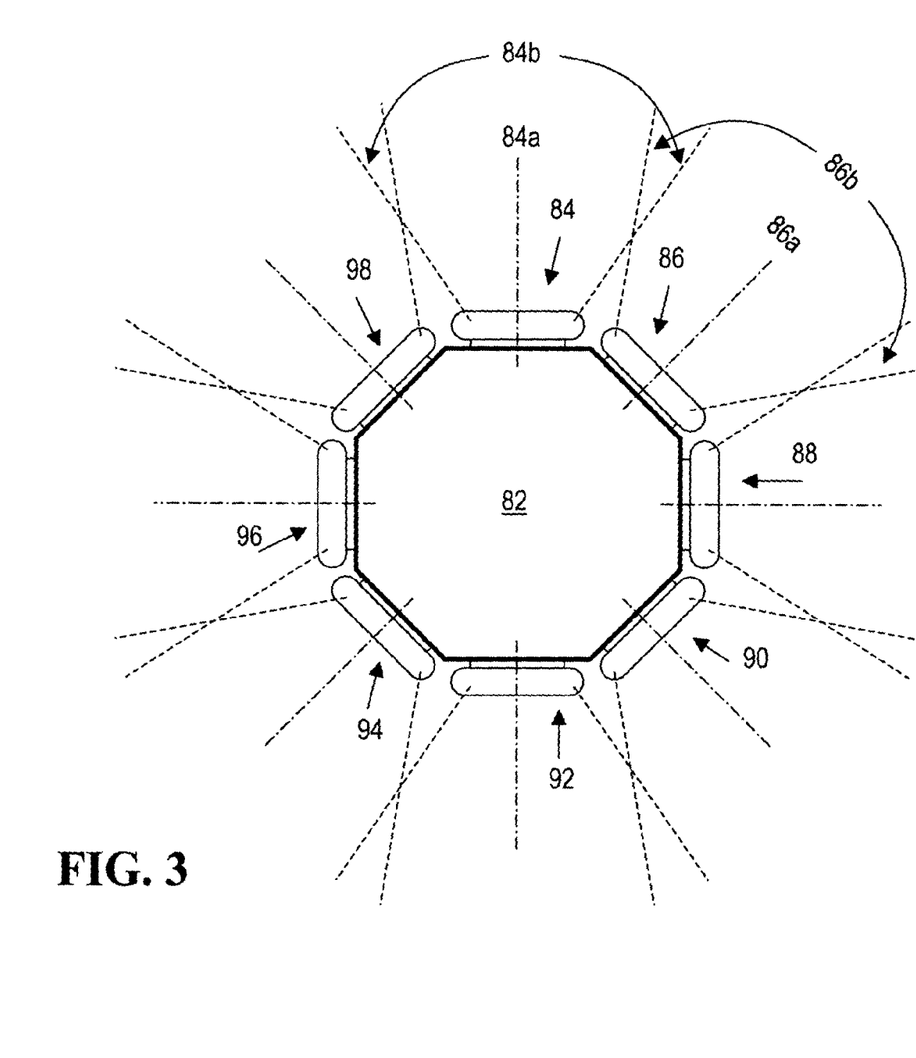
FIG. 3 depicts a top view of an imaging appliance that incorporates teachings of the present disclosure.

As described above in the brief description of the drawings, FIG. 3 depicts a top view of an imaging appliance 82 that incorporates teachings of the present disclosure. As depicted, appliance 82 has multiple video capture devices 84, 86, 88, 90, 92, 94, 96, and 98, each with different orientations and potentially different focal lengths and/or other optical characteristics. In operation, a given video capture device, like device 84, may be selected based on some activity occurring in the scene being "filmed" by device 84 or in a fashion that is similar to conventional video conferencing room cameras.

For example, a user may manually toggle from device 84 to device 86. The toggling may, for example, result in a triggering signal being sent to a selection mechanism. In other embodiments, appliance 82 may "know" that a speaker is in the scene captured by device 90 and trigger the selection of device 90. This "knowledge" may come from various sources including directional microphones. In some embodiments, a speaker may wear a communication device like a Bluetooth or other radio frequency device that communicates with a similar device associated with appliance 82. In effect, the worn device may tell appliance 82 which video capture device is capturing the desired scene and should, therefore, be made "active".

It should be noted, however, that as mentioned above some embodiments of appliance 82 may allow for more than one ISL module to be active at a time. With an appliance capable of multi-active ISL modules, the image that is generated by the appliance may be presented on a videoconferencing display as a collage of individual ISL images, a split screen image, a panoramic image, or some other and/or configurable display image.

Appliance 82 may come pre-configured for a given type of room and application or it may be configured on site with ISL modules that present the views of the room that are needed. In one embodiment, appliance 82 may be designed to reside at the front of a room with the majority of ISL modules mounted on one side of appliance 82. Appliance 82 may also be designed for middle of the scene applications like a conference room table, and individual ISL modules may have fields of view that overlap and ensure a panoramic view of the scene that covers 360 degrees.

As depicted in FIG. 3, appliance 82 includes eight video capture devices with equally spaced orientations and overlapping views. For example, video capture device 84 has an orientation with a centerline 84a and a field of view 84b. Similarly, video capture device 86 has an orientation with a centerline 86a and a field of view 86b. As shown, field of view 84b overlaps field of view 86b. This overlapping feature continues all the way around appliance 82 ensuring 360 degree coverage of the scene being captured by appliance 82.

In some embodiments, appliance 82 may also include an MPTZ sensor module or a fixed focal length sensor module that relies on processing engine supported PTZ. These modules could be audio activated or have preset PTZ values that attempt to capture the best video to be transmitted to a remote device. A typical MPTZ sensor module can generate a swooping effect that may make some viewers uncomfortable. As such, a dual sensor design may be used. One of appliance 82's video capture devices captures same scene video while another sensor or series of sensors tracks some motion or activity in the scene. When the motion or activity stabilizes, the inbound video feed is switched to the new video source.

It will be apparent to those skilled in the art that the disclosed embodiments may be modified in numerous ways and may assume many embodiments other than the particular forms specifically set out and described herein.

Accordingly, the above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus comprising:
    a chip comprising:
        a plurality of image sensor lens modules, wherein each of the plurality of image sensor lens modules is on a first side of the chip, wherein each of the plurality of image sensor lens modules has a field of view, wherein the plurality of imager sensor lens modules includes at least a first image sensor lens module and a second image sensor lens module, wherein the first image sensor lens module includes a first lens integrated with a first sensor, wherein the first image sensor lens module is operable to generate first raw image data, wherein the second image sensor lens module includes a second lens integrated with a second sensor, wherein the second image sensor lens module is operable to generate second raw image data, wherein the first raw image data represents a first view corresponding to a first field of view of the first image sensor lens module, and wherein the second raw image data represents a second view corresponding to a second field of view of the second image sensor lens module;
        a processing engine communicatively coupled to the first image sensor lens module and to the second image sensor lens module, wherein the processing engine is operable to:
            perform an image processing operation to transform raw image data received from one or more of the plurality of image sensor lens modules into one or more images; and
            communicate the one or more images to a display device;
        triggering module operable to:
            track motion in a particular view selected from the first view and the second view; and
            generate a selection signal; and
        a selector coupled to each of the plurality of image sensor lens modules and operable to:
            receive the selection signal from the triggering module; and
            selectively route the raw image data from one of the plurality of image sensor lens modules to the processing engine to be transformed into the one or more images, wherein the raw image data is selectively routed based on the selection signal; and
    a support having an exterior surface that comprises a mounting surface, wherein the chip is mounted on the mounting surface,
    wherein at least a portion of the fields of view of the plurality of image sensor lens modules overlap.

2. The apparatus of claim 1, wherein the chip further comprises a third image sensor lens module operable to generate third raw image data, the third image sensor lens module comprising a third lens integrated with a third sensor.

3. The apparatus of claim 1, wherein the chip is adjustably secured to the mounting surface.

4. The apparatus of claim 1, further comprising a microphone assembly communicatively coupled to the selector, wherein the selector is further to route the image data based on input received from the microphone assembly.

5. The apparatus of claim 1, wherein the selector routes the first raw image data to the processing engine when the selection signal indicates that the first image sensor lens module is aimed toward particular scene activity, and wherein the selector routes the second raw image data to the processing engine when the selection signal indicates that the second image sensor lens module is aimed toward the particular scene activity.

6. The apparatus of claim 5, further comprising an interface operable to communicatively couple an output of the processing engine to an external computing system, wherein the output is encrypted before the output is sent to the external computing system.

7. The apparatus of claim 1, wherein the first lens of the first image sensor lens module has a first depth of focus, and wherein the second lens of the second image sensor lens module has a second depth of focus different from the first depth of focus.

8. The apparatus of claim 1, wherein the processing engine and the selector replicate a pan, tilt and zoom operation by selectively causing only one of the first raw image data and the second raw image data to be transformed into the one or more images.

9. The apparatus of claim 1, wherein the processing engine performs a digital magnification by interpolating between pixels of the first raw image data.

10. The apparatus of claim 1, wherein the selector is further operable to concurrently route the first raw image data from the first image sensor lens module and the second raw image data from the second image sensor lens module to the processing engine, and wherein the processing engine is further operable to:
    receive the first raw image data;

receive the second raw image data; and generate a collage image that includes a first image and a second image, wherein the first image is associated with the first field of view associated with the first image sensor lens module, and wherein the second image is associated with the second field of view associated with the second image sensor lens module.

11. A method, comprising:

receiving first image information at a first image sensor lens module of a plurality of image sensor lens modules included in a chip, wherein the first image information represents a first view corresponding to a first field of view of the first image sensor lens module, wherein each of the plurality of image sensors is on a first side of the chip, and wherein each of the plurality of image sensors has a field of view;

receiving second image information at a second image sensor lens module of the plurality of image sensor lens modules included in the chip, wherein the second image information represents a second view corresponding to a second field of view of the second image sensor lens module, wherein the chip is integrated into a single electronic device that is mounted to a surface that has a planar geometry;

tracking, via a triggering module included in the chip, motion in a particular view selected from the first view and the second view;

generating, based on the tracking, a selection signal;

routing, via a selector module included in the chip, particular image information representing the particular view obtained from one of the plurality of image sensor lens modules to a processing engine included in the chip, wherein the particular image information is routed based on the selection signal; and performing an image processing operation on the particular image information at the processing engine to generate one or more images, wherein at least a portion of the fields of view of the plurality of image sensor lens modules overlap.

12. The method of claim 11, further comprising:

performing the image processing operation on the first image information until a desired view is not in the first view;

ceasing to perform the image processing operation on the first image information; and performing the image processing operation of the second image information.

13. The method of claim 11, further comprising initiating presentation of the one or more images on a display after performing the image processing operation.

14. The method of claim 11, further comprising:

when the image processing operation is being performed on the second image information, receiving a directional identification signal indicating activity at a location associated with the first view;

in response to the directional identification signal, ceasing to perform the image processing operation on the second image information; and performing the image processing operation on the first image information when the activity at the location stabilizes.

15. The method of claim 11, further comprising outputting post processed image signal information.

16. The method of claim 15, further comprising streaming the post processed image signal information.

17. The method of claim 11, further comprising:

encrypting output of the image processing operation; and sending the encrypted output to a remote computing system.

18. An apparatus comprising:

a device comprising:

a plurality of sides, wherein each of the plurality of sides has a planar shape;

a plurality of imaging devices, wherein at least one imaging device of the plurality imaging devices is adjustably attached to each of the plurality of sides, and wherein each of the plurality of imaging devices includes a chip, at least one of the chips comprising:

a plurality of image sensor lens modules, wherein each of the plurality of image sensor lens modules is on a first side of the chip, wherein each of the plurality of image sensor lens modules has a field of view, wherein the plurality of imager sensor lens modules includes at least a first image sensor lens module and a second image sensor lens module, wherein the first image sensor lens module includes a first lens integrated with a first sensor, wherein the first image sensor lens module is operable to generate first raw image data, wherein the second image sensor lens module includes a second lens integrated with a second sensor, wherein the second image sensor lens module is operable to generate second raw image data, wherein the first raw image data represents a first view corresponding to a first field of view of the first image sensor lens module, and wherein the second raw image data represents a second view corresponding to a second field of view of the second image sensor lens module;

a processing engine communicatively coupled to the first image sensor lens module and to the second image sensor lens module, wherein the processing engine is operable to:

perform an image processing operation to transform raw image data received from one or more of the plurality of image sensor lens modules into one or more images; and communicate the one or more images to a display device;

a triggering module operable to:

track motion in a particular view selected from the first view and the second view; and generate a selection signal; and a selection module coupled to each of the plurality of image sensor lens modules and operable to:

receive the selection signal from the triggering module; and selectively route the raw image data from one of the plurality of image sensor lens modules to the processing engine to be transformed into the one or more images, wherein the raw image data is routed based on the selection signal, wherein at least a portion of the fields of view of the plurality of image sensor lens modules overlap.

19. The apparatus of claim 18, wherein the triggering module is operable to:

receive information that identifies a desired field of view; and determine whether the desired field of view is associated with the first field of view or the second field of view, wherein the selection signal is generated based on whether the desired field of view is associated with the first field of view or the second field of view.

20. The apparatus of claim 18, wherein the first field of view and the second field of view share a common focal point, wherein the first image sensor lens module has a first focal length, and wherein the second image sensor lens has a second focal length that is different than the first focal length.

21. The apparatus of claim 18, wherein the device has an octagonal shape, wherein the plurality of sides comprises 8 sides, wherein the plurality of imaging devices comprises 8 imaging devices, and wherein a field of view associated with at least one image sensor lens module of each of the plurality of imaging devices overlaps with another field of view associated with an additional image sensor lens module of an adjacent imaging device.

22. The apparatus of claim 21, wherein a first particular field of view associated with a first particular image sensor module of a first particular imaging device of the plurality of imaging devices overlaps a second particular field of view associated with a second particular image sensor of a second particular imaging device of the plurality of imaging devices, wherein the first particular imaging device is attached to a first particular side of the plurality of sides, wherein the second particular imaging device is attached to a second particular side of the plurality of sides, and wherein the first particular side is adjacent to the second particular side.

23. The apparatus of claim 18, wherein the device is configured to output a collage image, wherein the collage image comprises at least a first image generated at a first particular imaging device of the plurality of imaging devices and a second image generated at a second particular imaging device of the plurality of imaging devices.

24. The apparatus of claim 23, wherein the first image depicts a first scene corresponding to a first particular field of view associated with a first particular image sensor module of the first particular imaging device and wherein the second image depicts a second scene corresponding to a second particular field of view associated with a second particular image sensor module of the second particular imaging.

25. The apparatus of claim 24, wherein the device is a communication device.

26. The apparatus of claim 18, wherein the first image sensor lens module, the second image sensor lens module, the selection module, the triggering module, and the processing engine are on a same side of the chip.

27. The apparatus of claim 18, wherein each of the plurality of imaging devices further comprises a microphone and a motion sensor, wherein the triggering module is further configured to generate the selection signal based on information received from at least one of the microphone and the motion sensor.

28. The apparatus of claim 18, further comprising a toggle mechanism configured to activate one or more imaging devices of the plurality of imaging devices.

* * * * *